(12) United States Patent
Ishii et al.

(10) Patent No.: US 9,091,319 B2
(45) Date of Patent: Jul. 28, 2015

(54) SHOCK ABSORBER WITH HYDRAULIC FLOW DUCTS

(75) Inventors: Atsushi Ishii, Upplands Vasby (SE); Alexandra Jarlmark, Upplands Vasby (SE)

(73) Assignee: Ohlins Racing AB, Upplands Vasby (SE)

( * ) Notice: Subject to any disclaimer, the term of this patent is extended or adjusted under 35 U.S.C. 154(b) by 560 days.

(21) Appl. No.: 12/525,711

(22) PCT Filed: Feb. 4, 2008

(86) PCT No.: PCT/SE2008/050134

§ 371 (c)(1),
(2), (4) Date: Aug. 4, 2009

(87) PCT Pub. No.: WO2008/097183

PCT Pub. Date: Aug. 14, 2008

(65) Prior Publication Data

US 2010/0018818 A1   Jan. 28, 2010

(30) Foreign Application Priority Data

Feb. 6, 2007   (SE) ...................................... 0700278

(51) Int. Cl.
*F16F 9/44*   (2006.01)
*F16F 9/46*   (2006.01)
*F16F 9/06*   (2006.01)

(52) U.S. Cl.
CPC ................. *F16F 9/466* (2013.01); *F16F 9/065* (2013.01)

(58) Field of Classification Search
CPC ................. F16F 9/26; F16F 9/44; F16F 9/46; F16F 9/064; F16F 9/096; F16F 9/185; B60G 2500/10; G01G 23/08; F15B 11/076
USPC ........... 188/313, 319.1, 275, 318, 314, 266.2, 188/298, 322.14, 269, 297, 266.5, 285, 188/378; 267/64.23, 221, 218, 64.26, 220

IPC .................................................. F16F 9/44,9/34
See application file for complete search history.

(56) References Cited

U.S. PATENT DOCUMENTS 1,836,381 A * 12/1931 McNab ......................... 188/269
2,640,693 A *  6/1953 Magrum ........................ 267/225

(Continued)

FOREIGN PATENT DOCUMENTS

EP      0237085 A1   9/1987
EP      0601982 B1   6/1994

(Continued)

OTHER PUBLICATIONS

International Search Report for PCT/SE2008/050134.

*Primary Examiner* — Anna Momper
*Assistant Examiner* — San Aung
(74) *Attorney, Agent, or Firm* — Brooks Kushman P.C.

(57) ABSTRACT

The present invention provides a hydraulic shock absorber. A solid main piston is designed to slide in a damping cylinder parallel to the movement generated when the shock absorber is subjected to a compression or a rebound stroke, the main piston dividing the damping cylinder into a first damping chamber containing the piston rod and a second damping chamber which does not contain the piston rod. A pressurization reservoir is pressurized by a force acting on a moving piston. The pressurization reservoir is arranged outside the damping cylinder and oriented at an angle relative to the damping cylinder. Two separate, adjustable valves generate a damping force acting in opposition to the stroke movement by restricting a damping medium flow between the damping chambers. A fourth defined chamber is hydraulically connected via separate flow paths to both the first and the second damping chamber and the pressurization reservoir.

19 Claims, 2 Drawing Sheets

(56) References Cited

U.S. PATENT DOCUMENTS

| | | | | |
|---|---|---|---|---|
| 4,732,244 | A | * | 3/1988 | Verkuylen .................... 188/318 |
| 5,460,355 | A | * | 10/1995 | Danek .......................... 267/221 |
| 5,957,252 | A | | 9/1999 | Berthold |
| 7,766,138 | B2 | * | 8/2010 | Sintorn ...................... 188/322.2 |
| 2005/0098401 | A1 | * | 5/2005 | Hamilton et al. ............. 188/378 |
| 2006/0102440 | A1 | * | 5/2006 | Nygren et al. ................ 188/314 |
| 2008/0111022 | A1 | * | 5/2008 | Lahargou et al. ......... 244/100 R |

FOREIGN PATENT DOCUMENTS

| | | |
|---|---|---|
| EP | 1505315 A2 | 2/2005 |
| EP | 1659310 A2 | 5/2006 |
| WO | 2008/073023 A1 | 6/2008 |

\* cited by examiner

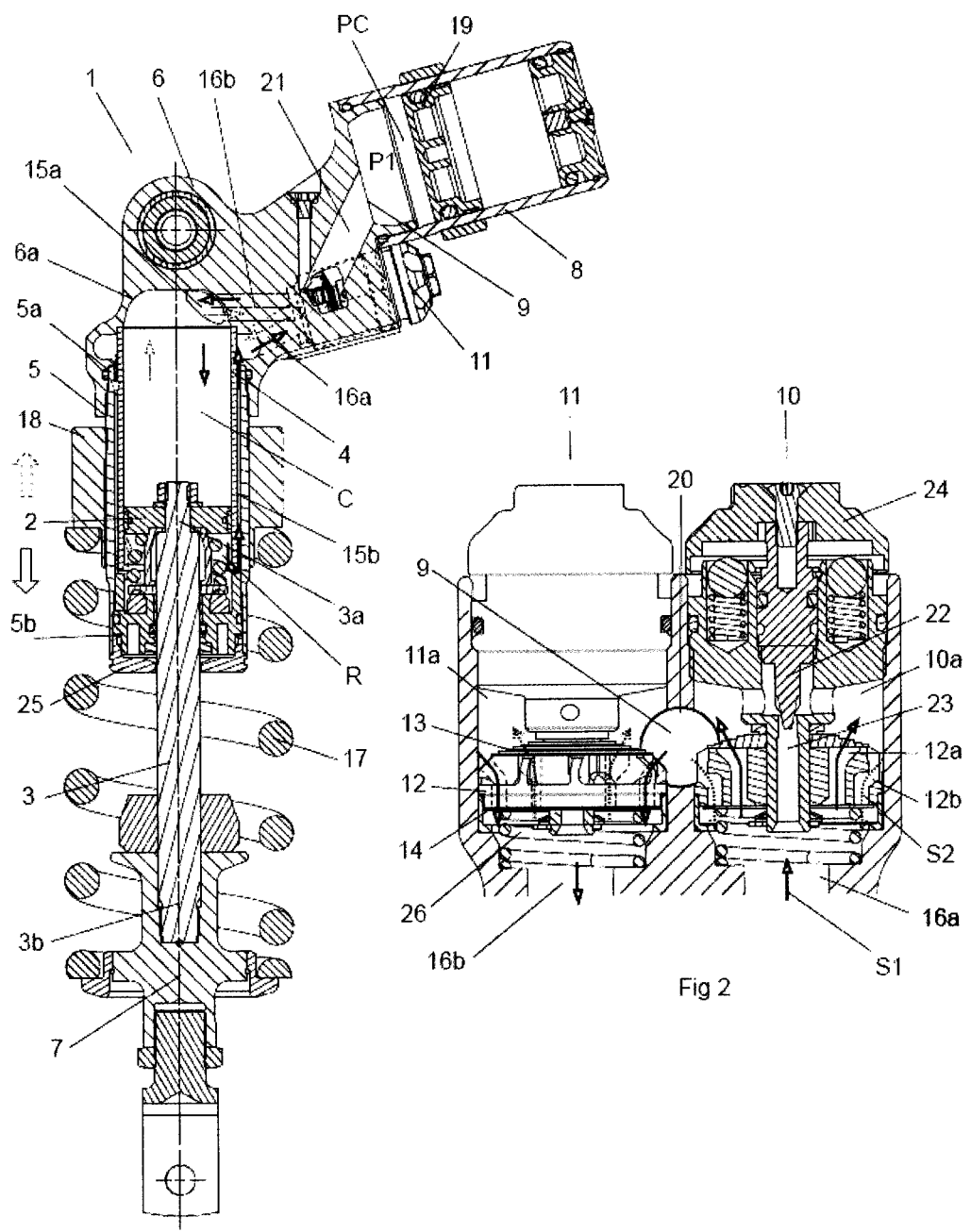

SHOCK ABSORBER WITH HYDRAULIC FLOW DUCTS

TECHNICAL FIELD

The present invention relates to a pressurized, damping medium-filled shock absorber having an externally located pressure reservoir, a so-called piggyback.

BACKGROUND OF THE INVENTION

In order to avoid cavitation whilst retaining a large adjustment range and a rapid response time even with large pressure differentials over the main piston, which divides a shock absorber into two damping medium-filled chambers, a compression chamber and a rebound chamber, use is currently made of a principle which is referred to by the applicant as so-called positive pressure build-up or TTX. A pressurized damper with positive pressure build-up always has a pressure greater than zero on both sides of the main piston arranged in the damping cylinder, regardless of what conditions prevail. Pressurization on both sides of the main piston is achieved in that a gas pressurized member, arranged in a pressurization reservoir, pressurizes a damping medium-filled chamber common to both damping chambers to a predetermined pressure. Pressurization of the damping medium in the body of the damper can then be said to occur parallel with the movement, since the pressurized common chamber has a parallel connection to both of the damping chambers. The two damping chambers can be connected to the common chamber by means of a first flow duct between the compression chamber and the common chamber and a second flow duct between the rebound chamber and the common chamber. Two separate adjusting elements are provided in order to adjust the flow in the flow ducts between the respective damping chamber and the pressurized common chamber. Said adjusting elements comprise one or more damping force-generating, one-way valves(s) and a check valve, which opens as soon as the pressure in the common chamber exceeds the pressure in the chamber having the lowest pressure at that particular instant.

See the applicant's own patent application EP 1659310 A2, for example, in which a solid piston is used and in which the pressurization reservoir is arranged in a defined space inside the damping cylinder. Arranging the pressurization reservoir in line with the body of the damper results in a long overall length of the damper, and requires a complicated manufacturing process in order to create the flow ducts between the pressurization reservoir and each damping chamber.

Öhlins TTX system has also been used in a type of damper which has an external reservoir, a so-called "piggyback". The external reservoir is then arranged outside but connected to the damping cylinder, and the internal damping medium-filled volume of the damping cylinder is connected to the interior of the reservoir via ducts defined by separate adjusting elements.

Some of these types of damper are designed to be capable of absorbing rapid movements and heavy impacts, caused by the nature of the running surface with its stones, holes and large irregularities. The limitation of the TTX principle in this type of damper lies in the area of the flow ducts and their capacity to transmit a sufficiently large flow of damping medium. In the prior art this limitation is solved by allowing a flow over the main piston in the event of large pressure differentials. The flow of damping medium is therefore parallel in the event of small pressure differentials and linear in the event of large pressure differentials, which means that in order to modify the damping characteristic of the shock absorber, adjustments need to be made to at least two adjustment points in order to adjust both the high-speed and the low-speed damping. In addition, it has proved difficult to fully control the pressure balance in a damper having two adjustment points. Further disadvantages are that a complete modification of the damping characteristic requires dismantling of the damper, whilst the pressure in the pressurizing reservoir has to be adjusted and balanced with the pressure in the damping chambers.

Another known solution is disclosed in the patent EP 1505315, which describes a damper having an external reservoir in which the damping chambers are separated from one another by a main piston, which at certain pressure differentials over the main piston allows a flow through the main piston. The damper also has two separate adjusting valves, designed to adjust the flow in flow ducts extending between the respective damping chamber and a pressurized damping medium-filled chamber in the external reservoir. Under a compression stroke, the compression chamber is pressurized via a first adjusting valve to a pressure that prevails in an external pressurization vessel, so as to prevent a negative pressure in the chamber. Under a rebound stroke the second adjusting valve is used to adjust the damping characteristic. In this damper also, a flow is allowed over the main piston and the ducts that extend between the valves and the respective damping chamber are only adjusted to the flow that prevails at small to medium damping speeds.

With a TTX damper having a solid main piston, like that in EP 1659310 A2, all the damping medium subjected to the area of the main piston acting on the damping medium is forced through the respective flow duct. Adjustment of the damping characteristic is then simplified in that only the externally located adjusting elements/the valves are used for this adjustment. This means, however, that the ratio between the area of the main piston and the area of the flow ducts becomes critical for the flow of damping medium through the valves. In addition, it is desirable, in order to ensure that a positive pressure prevails in the damping chambers and to obtain the same valve characteristic in both valves, that one and the same pressure should act on both of the valves without introducing unnecessary restrictions into the shock absorber.

In order to produce a compact TTX damper, valves having a smaller diameter/area than the diameter/area of the main piston are used. Since the area of the valve is smaller than the area of the solid main piston, this means that a restriction nevertheless has to be introduced into the system somewhere or other.

Creating a restriction of the damping medium flow in a vehicle damper having a positive pressure build-up and a solid main piston, without a turbulent flow occurring, has proved to be a problem.

There can also be a problem, when using a valve diameter smaller than the diameter of the main piston, in that the variation in the rate of flow via the damping ducts needs to be so great that disturbances and fluctuations can occur during movement of the oil. Valve resonance can also occur, which can lead to jarring and an impaired damping function.

It can moreover be difficult to solve these problems without the damper assuming excessive dimensions, especially in a longitudinal direction, that is to say from fixing point to fixing point.

OBJECT OF THE INVENTION

The object of the present invention is to solve the problem of creating a uniform pressurization of two valves arranged in a shock absorber having a solid main piston, so as to ensure a positive pressure in the damping chambers without a turbulent flow, valve resonance or oil fluctuation occurring.

A further object of the invention is to solve this problem in a way that provides a simple, short damper of inexpensive design construction.

SUMMARY OF THE INVENTION

The invention relates to a hydraulic shock absorber which comprises a solid main piston fixed to an upper part of a piston rod. The main piston is designed to slide in a damping cylinder parallel to the movement generated when the shock absorber is subjected to a compression or a rebound stroke. The main piston divides the damping cylinder into a first damping chamber containing the piston rod and a second damping chamber which does not contain the piston rod. No damping medium can pass via the solid main piston. Arranged around the damping cylinder is an outer tube, which is defined at its first end by a first fixing element having an inner surface facing towards the second damping chamber, and at its other end by a second fixing element. The upper fixing element preferably takes the form of a cylinder head and is intended to be fastened to a vehicle chassis, for example a motor cycle, a car or some other vehicle, and the lower fixing element preferably takes the form of an end eye and is intended to be fixed to a wheel, a ski or a runner.

The shock absorber also comprises a pressurization reservoir, comprising a moving piston on which a force acts so that a damping medium-filled reserve chamber arranged in the reservoir is pressurized. The pressurization reservoir is connected to the first fixing element but is arranged outside the outer tube. For example, the pressurization reservoir may be arranged parallel to the damping cylinder and the outer tube, or it may have an angular offset between the damping cylinder and the reservoir in a horizontal and/or vertical direction. Two separate, adjustable valves are designed to generate a damping force acting in opposition to the stroke movement by restricting a damping medium flow between the damping chambers.

A fourth defined chamber is arranged in the first fixing element. This chamber is hydraulically connected via separate flow paths to both the first and the second damping chamber and the pressurized damping medium-filled reservoir chamber. This fourth chamber may be said to be a chamber common to the two damping chambers, since it is connected to both of the damping chambers. Since the common fourth chamber is connected to the pressurized damping medium-filled reservoir chamber, said chamber is at the same pressure as the reservoir chamber and no unnecessary restrictions are introduced into the system. The pressure in the reservoir chamber is always greater than zero, which means that the pressure in the damping chambers is also always greater than zero.

In a first embodiment two first and second flow ducts connected to the flow paths are arranged in the first fixing element. The adjustable valves are located in the first and second flow ducts at a certain distance from the inner surface of the first fixing element. The flow ducts have a first flow-restricting area dependent upon the flow duct diameter, which is between 10 and 20% of the area of the main piston. This area ratio means that the flow ducts partially restrict the damping medium flow but are at the same time large enough to substantially prevent a turbulent flow through the adjustable valves at main piston speeds of less than 0.5 m/s.

The flow ducts have the same duct diameter over their entire extent in a longitudinal direction between the inner surface of the fixing element and the position where the adjustable valves are located in the flow ducts. The adjustable valves, however, are located in the flow ducts in a first and a second valve chamber having a diameter which is greater than the diameter of the flow ducts. Because the flow ducts also have a longitudinal extent, even the disturbances in the oil induced by the restriction will be damped out and the flow will become substantially laminar or transient again before it reaches the valves. Since the main piston is solid, all damping force is generated by the adjustable valves.

The valves are designed to comprise a valve core having ducts extending through the core, in which the ducts are defined by leaf valves in the form of thin disks, so-called shims, arranged on either side of the core. When a flow caused by the movements of the main piston creates such a high pressure in the ducts passing through the valve core that a force is generated which exceeds the opposing force of the shims, the shims are bent and a flow is permitted in the through-ducts between the two sides of the valve core. In the valve chambers where the adjustable valves are located in the flow ducts, the valve chamber diameter largely coincides with the outside diameter of the valve core.

The flow ducts are connected together by a through-passage, which also extends from the interior of the pressurization reservoir. Owing to the connection to the pressurization reservoir, the passage is pressurized with a pressure and can therefore be described as the chamber common to both of the damping chambers. When the two adjustable valves are also connected to one another via the through passage, one and the same pressure prevails in the valve chambers and on the first side of the valve core. Because the same pressure prevails at both of the valve cores, both of the valves always react equally rapidly to a change in pressure, whilst valve resonance is easier to prevent. In addition, the external dimensions can be minimized since the valves are located so close together.

The invention will be described in more detail below, with reference to the drawings attached.

BRIEF DESCRIPTION OF THE DRAWINGS

FIG. 1 shows a pressurized shock absorber according to a first embodiment of the invention FIG. 2 shows an enlarged view of the valves arranged in the first fixing element

DETAILED DESCRIPTION OF THE INVENTION

Figure 3B:
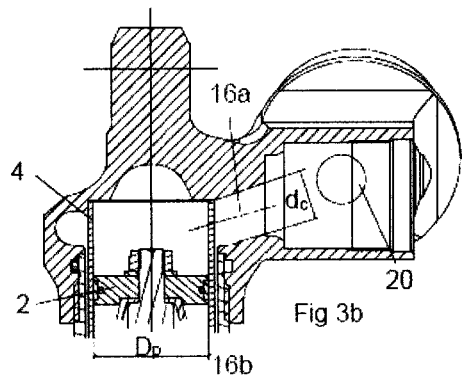
FIG. 3b shows an enlarged view of the rebound duct arranged in the first embodiment of the fixing element

FIG. 1 shows a hydraulic shock absorber 1, which comprises a solid main piston 2 fixed to an upper part of a piston rod 3 and designed to slide in a damping cylinder 4. The term solid piston head implies that the piston does not allow any damping medium to pass through but is intended to compress or push in front of it all the damping medium on which the area of the piston acts during a movement. The damping cylinder 4 is defined by the main piston 2 in a first damping chamber R, containing the piston rod 3 and a second damping chamber C which does not contain the piston rod 3. Arranged around the damping cylinder 4 is an outer tube 5 having a diameter greater than the damping cylinder so that a gap is created between damping cylinder 4 and the outer tube 5. The outer tube 5 is defined at its first end 5a by a first fixing element 6 having an inner surface 6a, which adjoins the second damping cylinder C, and at its other end 5b by a sealing assembly 25. A second fixing element 7 is fastened to the other end of the piston rod. The first fixing element 6 preferably takes the form of a cylinder head and is intended to be fastened to a vehicle chassis (not shown), for example a motor cycle, a car or some other vehicle, and the second fixing element 7 preferably takes the form of an end eye or end ring and is intended to be fixed to a wheel, a ski or a runner (not shown).

A spring 17 is also located around the outer tube 5. The spring is held between the second fixing element 7 and a spring washer 18, which is firmly threaded onto the outer leg 5. A damping rubber part, a so-called bump-stop, is arranged on the second fixing element 7, in order to prevent metal-to metal contact occurring between the damping cylinder 4 and the second fixing element 7 when the shock absorber 1 is subjected to such a large force that it is fully compressed.

The shock absorber 1 also comprises a pressurization reservoir 8 with a reservoir chamber PC connected to the cylinder head 6 but arranged outside the outer tube 5. The pressurization reservoir 8 is divided into a damping medium-filled volume by a reservoir piston 19, acting on which is a force generated, for example, by a spring or a compressible medium, such as a gas. This force pressurizes the damping medium volume in the reservoir chamber PC, so that the pressure in the damping medium volume is at least equal pressure P1. The reservoir chamber may also be pressurized through the introduction of a rubber bladder (not shown) defined in relation to the reservoir chamber PC and filled with the compressible medium. In FIG. 1 the reservoir 8 is located at an angle of approximately 120 degrees to the outer tube. The location of the reservoir 8 will depend on what type of vehicle the damper is to be seated on and then primarily on what space is available for locating the damper. For example, the pressurization reservoir 8 may also be arranged parallel to the damping cylinder 4 and the outer tube 5, or it may have an angular offset between the damping cylinder 4 and the reservoir 8 in a horizontal and/or vertical direction. See also FIGS. 3a-3c.

The pressurization reservoir 8 also pressurizes a fourth defined chamber 9 common to both of the damping chambers C, R to a certain basic pressure that coincides with the pressure P1. The common chamber is hydraulically connected to the first and the second damping chamber by separate flow paths 15a, 15b. Two separate adjustable valves 10, 11, are arranged between the common chamber 9 and each damping chamber C, R in the valve chambers 10a, 11a, in order to generate damping force through restriction of a damping medium flow between the damping chambers C, R when the damper is subjected to a compression or a rebound stroke causing the main piston 2 to assume a certain speed. In FIG. 1 the compression direction is drawn in with a dashed arrow and the rebound direction with a solid arrow.

The adjustable valves 10, 11 are arranged between the common chamber 9 and the respective damping chamber C, R in the separate flow paths 15a, 15b. The first flow path 15a extends between the second damping chamber C and the common chamber 9 and the second flow path 15b extends between the first damping chamber R, via the gap arranged between the damping tube 2 and the outer tube 5. The first flow path 15a can therefore be said to coincide wholly or partially with a first flow-restricting duct 16a and the terminating portion of the second flow path 15b, which opens into the common chamber 9, may be termed a second flow-restricting duct 16b. Both the first and the second flow-restricting ducts 16a, 16b are arranged in the first fixing element 6. In the valve chambers 10a, 11a where the valves 10, 11 are located, the diameter of the flow ducts 16a, 16b increases to a diameter that substantially coincides with an outside diameter of a valve core 12 arranged in the valves, see FIG. 2.

When the damper operates in either stroke direction, compression or rebound, the main piston 2 moves in the damping cylinder 3 and in this way creates a pressure differential in the damping chambers C, R. The pressure differentials create a damping medium flow which in a compression stroke is led in a first loop S1 from the compression chamber C via the flow duct 16a, through the compression valve 10, to the common chamber 9, out through a check valve in the rebound valve 11, via the flow path 15b to the rebound chamber R. See the dashed arrows in FIG. 1. The oil that is displaced by the piston rod 2 or the additional volume that is caused by thermal expansion of the oil is taken up by the reservoir 8. In a rebound stroke the damping medium is led in a second loop S2 corresponding to the first loop, but in the opposite direction, see the solid arrows in FIG. 1.

The valves 10 and 11 are shown in more detail in FIG. 2. The valves 10, 11 are of identical design and have a valve core 12 with ducts 12a, 12b extending through the core 12, the ducts being defined by flexible leaf valves 13, so-called shims, and the ducts 12b being defined by a rigid leaf valve or a disk 14. The two types of leaf valves are arranged on either side of the piston 12. The rigid leaf valve 14 is pressed by a spring 26 against one side of the core 12. Also incorporated in the valve body is a conical leakage flow-determining valve 22, arranged in a leakage flow duct 23, the position of which in the valve body is adjustable from outside the damper via an adjusting wheel 24. The side of the valve core 12 where the flexible leaf valves 13 are arranged adjoins the valve chambers 10a/11a and the opposite side of the valve core adjoins the first and second flow ducts 16a/16b in the first fixing element 6. The damping characteristics of the valve are adjusted by varying the number of shims 13 or by adjusting the bleed aperture in the leakage flow duct 23. The number of shims and the size of the bleed aperture may naturally vary for the compression or rebound valve.

When a flow caused by the movements of the main piston 2 creates such a high pressure in the ducts 12a, 12b passing through the valve core 12 that a force is generated which exceeds the opposing force 13 of the shims, the shims are bent and a flow is permitted in the through-ducts between the two sides of the valve core 12. The compression flow has here been drawn in with solid arrows and the return flow with dashed arrows. When only small pressure differentials prevail over the main piston 2 and a small flow must pass through the valves 10, 11, this passes via the leakage flow-determining valve 22.

The flow ducts 16a, 16b are connected together by a first through-passage 20, which is also connected to a second passage 21 (see FIG. 1), which runs from the interior of the pressurization reservoir 8. The passage 20 basically opens out on the first side of the valve core where the flexible leaf valve 13 is arranged. The connection to the pressurization reservoir means that the passage 20 together with the valve chambers 10a and 11a can therefore be designated as the chamber 9 common to the two damping chambers.

The first through-passage 20 then also connects the valves 10 and 11 together, so that one and the same pressure prevails in the valve chambers 10a and 11a. This pressure substantially coincides with the pressure in the pressurization reservoir. Because the length of the second passage 21, which runs from the interior of the pressurization reservoir, is the same for both of the valves, this ensures that the valves always react equally rapidly to a change in pressure. A restriction in the form of a duct always leads to a certain damping of the damping medium flow, which means that the pressure is built up with a certain delay. A further advantage in connecting the two valve chambers 10a and 11a together is that the external dimensions can be minimized, since the valves are located parallel to one another and a minimal distance apart.

Since the main piston 2 is solid, all damping force is generated by the respective valve 10, 11. The valves 10, 11 are located in the first and second flow ducts 16a, 16b at a certain minimum distance x from the inner surface 6a of the first fixing element 6. The flow ducts 16a, 16b have a first area dependent upon the duct diameter $D_c$ which partially restricts the damping medium flow but is large enough to substantially prevent a turbulent flow through the adjustable valves 10, 11 in the case of main piston speeds of less than 0.5 m/s. The turbulent flow is prevented in that the first area selected for the flow ducts is between 10 and 20% of the area of the main piston.

Selecting this ratio between the areas means that the Reynolds number does not exceed 4000 and the flow through the ducts is kept laminar and transient up to main piston speeds of 0.5 m/s, which is the normal operating range for the damper. At piston speeds in excess of 0.5 m/s a turbulent flow in the ducts is not as critical, since a greater damping in the valves is then in most cases required in order to avoid under-damping resulting in undamped oscillations.

A reduction in area as described above increases the speed of flow of the oil by a factor corresponding to the ratio between the area of the main piston 2 and that of the valve duct 16a, 16b. As the speed of flow increases, this affects the dynamics of the damper in that the influence of the inertial forces contributing to the flow characteristics of the oil increases. Since the oil flows faster in the ducts 16a, 16b, the acceleration of the damping medium in the damping cylinder 4 is lower than the acceleration in the ducts 16a, 16b. This inertial force affects the dynamics in the form of hysteresis under large strokes and in the event of turning situations with high accelerations. By arranging the flow ducts 16a, 16b with a certain predetermined first flow area in the first fixing element 6, use is made of the inertial forces in the ducts in order to introduce an artificial and controlled hysteresis into the damping characteristic.

Because the flow ducts 16a, 16n also have a longitudinal extent x, even the disturbances in the oil induced by the restriction will be damped out and the flows will become substantially laminar or transient again before they reach the valves 10, 11.

Figure 3A:
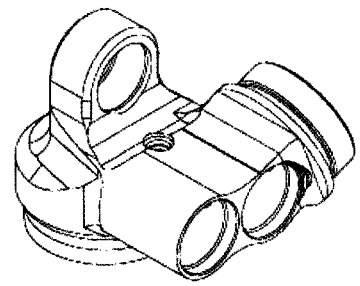
FIG. 3a shows an enlarged view of a first embodiment of the first fixing element
Figure 4B:
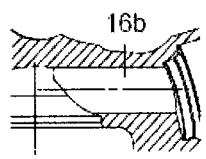
FIG. 4b shows an enlarged view of the rebound duct arranged in the second embodiment of the fixing element
Figure 4C:
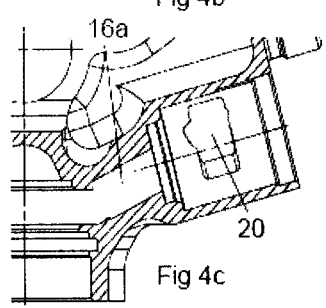
FIG. 4c shows an enlarged view of the compression duct arranged in the second embodiment of the fixing element
Figure 4A:
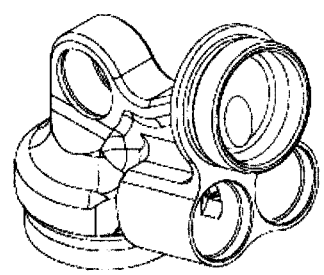
FIG. 4a shows an enlarged view of a second embodiment of the first fixing element
Figure 5B:
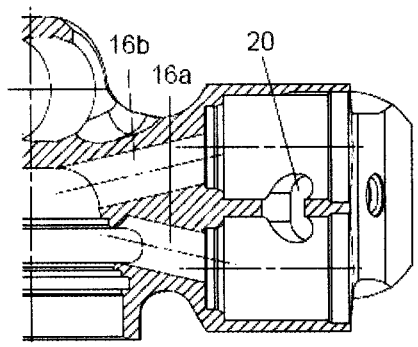
FIG. 5b shows an enlarged view of both the rebound and the compression duct arranged in the third embodiment of the fixing element.
Figure 5A:
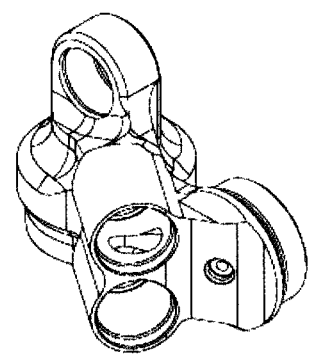
FIG. 5a shows an enlarged view of a third embodiment of the first fixing element

FIGS. 3a, 4a and 5a show three different embodiments of the first fixing element 6, which preferably takes the form of a cylinder head.

Figure 3C:
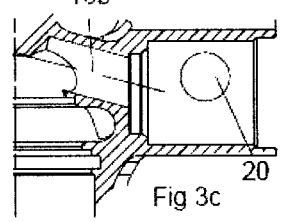
FIG. 3c shows an enlarged view of the compression duct arranged in the first embodiment of the fixing element

FIGS. 3b and 3c show the first embodiment 3a, shown in FIG. 3a, of the cylinder head 6 in a cross-sectional view through the respective flow duct 16a, 16b. FIG. 3b shows a cross section through the duct 16a which connects the rebound chamber R to the common chamber 9. FIG. 3a shows a cross section through the duct 16b, which connects the compression chamber C to the common chamber 9. The passage 20 extending between the valves 5 can also be seen from the figures. FIG. 3b also shows the damping tube 5 and the main piston 2. The main piston 2 has a diameter $D_p$ and the flow duct 16a has a diameter $D_c$. The ratio between the first flow duct area and the main piston area $(\pi D_c^2/4 / \pi D_p^2/4)$ is preferably between 10 and 20%.

FIG. 4a shows the second embodiment 3b of the cylinder head 6 in a cross section through the respective flow duct 16a, 16b. FIG. 4c shows a cross section through the duct 16a, which connects the rebound chamber R to the common chamber 9. FIG. 4b shows a cross section through the duct 16b which connects the compression chamber C to the common chamber 9. The figures also show the first through-passage 20 extending between the valves.

FIG. 5a shows the third embodiment 3c of the cylinder head 6. FIG. 5b shows a cross section through the two ducts 16a, 16b, which respectively connect the rebound chamber R to the common chamber 9 and the compression chamber C to the common chamber 9. The figures also show the first through-passage 20 extending between the valves.

The invention is not limited to the exemplary embodiment demonstrated above, but may be modified without departing from the scope of the following patent claims and the idea of the invention.

The invention claimed is:

1. Hydraulic shock absorber comprising:
   a solid main piston, impervious to damping medium, which is fixed to a first part of a piston rod and is designed to slide in a damping cylinder parallel to the movement generated when the shock absorber is subjected to a compression or a rebound stroke, the main piston dividing the damping cylinder into a first damping chamber containing the piston rod and a second damping chamber which does not contain the piston rod;
   an outer tube which is arranged around the damping cylinder and is defined at its first end by a first fixing element having an inner surface facing towards the second damping chamber;
   a pressurization reservoir divided by a separating member to define a third chamber filled with damping medium pressurized by a force acting on the separating member, the pressurization reservoir being connected to the first fixing element but arranged radially outside the outer tube;
   a fourth defined chamber arranged in the first fixing element and hydraulically connected via a first flow duct to the first damping chamber, hydraulically connected via a second flow duct to the second damping chamber, and hydraulically connected to the third chamber, the first flow duct having a first flow duct diameter which increases to define a first valve chamber and the second flow duct having a second flow duct diameter which increases to define a second valve chamber; and
   two separate, adjustable valves, arranged in the first and second valve chambers respectively, and designed to generate a damping force acting in opposition to the stroke movement by restricting a damping medium flow between the damping chambers.

2. Hydraulic shock absorber according to claim 1, wherein the first and second flow ducts are arranged in the first fixing element.

3. Hydraulic shock absorber according to claim 2, wherein the adjustable valves are located in the first and second flow ducts at a certain distance from the inner surface of the first fixing element.

4. Hydraulic shock absorber according to claim 3, wherein the first and second flow diameters are constant between the inner surface of the fixing element and the position where the adjustable valves are located in the flow ducts.

5. Hydraulic shock absorber according to claim 1, wherein the adjustable valves are composed of a valve core having ducts extending through the core, the ducts being defined by leaf valves in the form of thin disks, arranged on either side of the core.

6. Hydraulic shock absorber according to claim 5, wherein the first and second flow duct diameters increase in the first and second valve chambers to substantially coincide with an outside diameter of the valve core.

7. Hydraulic shock absorber according to claim 2, wherein the flow ducts are connected together by a first through-passage, to which a second passage, extending from the interior of the pressurization reservoir, is also connected.

8. Hydraulic shock absorber according to claim 7, wherein the first through-passage coincides with the chamber common to the two damping chambers.

9. Hydraulic shock absorber according to claim 7, wherein the through-passage extends between the first and the second valve chambers in which the adjustable valves are located.

10. Hydraulic shock absorber according to claim 1, wherein the first fixing element is a cylinder head, which connects the pressurization reservoir and the outer tube together.

11. Hydraulic shock absorber according to claim 1, wherein the separating member comprises a movable second piston.

12. Hydraulic shock absorber according to claim 3, wherein the first and second flow ducts have a first flow-restricting area which is between 10 and 20% of the area of the main piston, so that it partially restricts the damping medium flow but is large enough to substantially prevent a turbulent flow through the adjustable valves at main piston speeds of less than 0.5 m/s.

13. Hydraulic shock absorber according to claim 1, wherein the adjustable valves are arranged between the fourth chamber and the respective damping chamber.

14. Hydraulic shock absorber according to claim 13, wherein the valve chambers are connected together by a first through-passage.

15. Hydraulic shock absorber according to claim 14, wherein the fourth chamber is defined by the first through-passage and the valve chambers.

16. Hydraulic shock absorber according to claim 14, wherein the first through-passage is connected to the third chamber by a second passage.

17. Hydraulic shock absorber according to claim 16, wherein the length of the second passage is the same for both valves, thereby ensuring that the valves always react equally rapidly to a change in pressure.

18. Hydraulic shock absorber according to claim 1, wherein said force is generated by a spring or compressible medium acting on said separating member.

19. Hydraulic shock absorber comprising:
a solid main piston, impervious to damping medium, which is fixed to a first part of a piston rod and is designed to slide in a damping cylinder parallel to the movement generated when the shock absorber is subjected to a compression or a rebound stroke, the main piston dividing the damping cylinder into a first damping chamber containing the piston rod and a second damping chamber which does not contain the piston rod;
an outer tube which is arranged around the damping cylinder and is defined at its first end by a first fixing element having an inner surface facing towards the second damping chamber;
a pressurization reservoir divided by a separating member to define a third chamber filled with damping medium pressurized by a force on the separating member, the pressurization reservoir being connected to the first fixing element but arranged radially outside the outer tube;
a fourth defined chamber arranged in the first fixing element and hydraulically connected via a first flow duct to the first damping chamber, hydraulically connected via a second flow duct to the second damping chamber, and hydraulically connected to the third chamber; and
two separate, adjustable valves designed to generate a damping force acting in opposition to the stroke movement by restricting a damping medium flow between the damping chambers, wherein the first and second flow ducts have a flow-restricting area which is between 10 and 20% of an area of the main piston, so that it partially restricts the damping medium flow but is large enough to substantially prevent a turbulent flow through the adjustable valves at main piston speeds of less than 0.5 m/s.

* * * * *